United States Patent [19]
Albukerk et al.

[11] Patent Number: 5,929,848
[45] Date of Patent: Jul. 27, 1999

[54] INTERACTIVE PERSONAL INTERPRETIVE DEVICE AND SYSTEM FOR RETRIEVING INFORMATION ABOUT A PLURALITY OF OBJECTS

[75] Inventors: Laurence Albukerk; William Waytena, both of San Francisco, Calif.

[73] Assignee: Visible Interactive Corporation, San Francisco, Calif.

[21] Appl. No.: 08/655,158

[22] Filed: May 29, 1996

Related U.S. Application Data

[63] Continuation of application No. 08/333,486, Nov. 2, 1994, abandoned.

[51] Int. Cl.$^6$ ..................................................... G06F 15/00
[52] U.S. Cl. .................... 345/326; 345/348; 340/825.29; 340/825.69; 340/825.72; 455/3.2; 455/41; 455/511; 455/517; 455/526
[58] Field of Search .................................... 345/326, 348, 345/349; 340/825.25, 825.35, 825.49, 825.54, 825.69, 825.72; 455/3.2, 41, 457, 517, 518, 526

[56] References Cited

U.S. PATENT DOCUMENTS

| | | | |
|---|---|---|---|
| 4,081,669 | 3/1978 | Klingman, III | 250/199 |
| 4,598,275 | 7/1986 | Ross et al. | 340/573 |
| 4,752,776 | 6/1988 | Katzenstein | 340/825.54 |
| 4,780,599 | 10/1988 | Baus | 235/383 |
| 4,818,998 | 4/1989 | Apsell et al. | 342/44 |
| 5,134,720 | 7/1992 | Gamgee et al. | 455/164.1 |
| 5,317,318 | 5/1994 | Thomas et al. | 342/44 |
| 5,455,851 | 10/1995 | Chaco et al. | 379/38 |
| 5,461,371 | 10/1995 | Matsumoto et al. | 340/825.25 |

OTHER PUBLICATIONS

European Patent Office, "System for Integrating and Collating Audio and Text and for Text Creation and Editing", IBM Technical Disclosure Bulletin, vol. 16, n. 2, pp. 500–503, Jul., 1973.

*Primary Examiner*—Ba Huynh
*Attorney, Agent, or Firm*—Fenwick & West LLP

[57] ABSTRACT

A system for providing interpretive information about objects or exhibits located in a facility employs a plurality of object identification devices, each disposed at an object or exhibit of interest, and each transmitting a signal identifying the object there located, and any number of personal interpretive devices that receive the signal and retrieve information from a storage device about the object identified by the received signal. The retrieved information includes text data, graphic data, and audio data, which is a recording of the text data. The text data is output on a display and the audio data is output by an audio output circuit in synchronism with the text display. The data is stored in a compressed format to increase the overall amount of information available. Information comparing an object with previous objects is retrieved when the object is one of predetermined set of objects, and others in the set having already been viewed. The information about the objects includes both general and detailed information, and the level of information retrieved is selectable by the visitor. When the visitor has retrieved detailed information for a predetermined number of exhibits, detailed information is retrieved directly for further exhibits. A timing function limits the amount of time the personal interpretive device can be used. The personal interpretive devices may be interconnected via signal transmission to allows interconnected devices to commonly view object information. The system regulates traffic in the facility by monitoring the positions of the personal interpretive device and redirecting them to less congested locations.

39 Claims, 10 Drawing Sheets

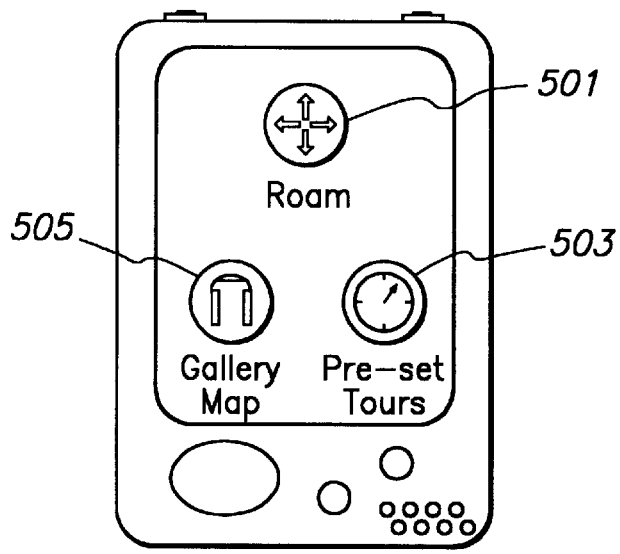
FIGURE 5A
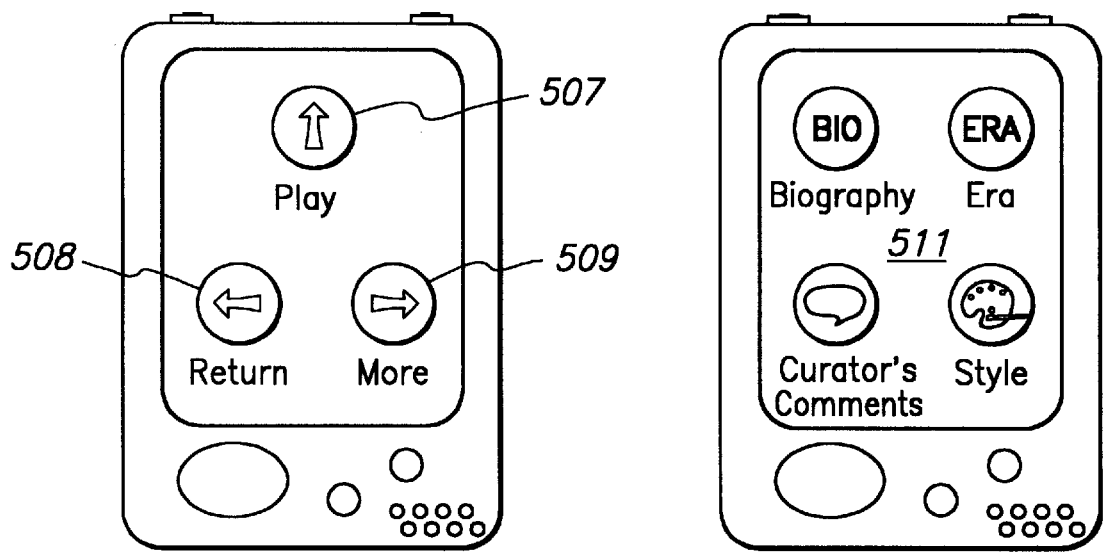
FIGURE 5B  FIGURE 5C

INTERACTIVE PERSONAL INTERPRETIVE DEVICE AND SYSTEM FOR RETRIEVING INFORMATION ABOUT A PLURALITY OF OBJECTS

RELATED APPLICATIONS

This is a continuation of Prior application Ser. No. 08/333,486 filed on Nov. 2, 1994 now abandoned.

BACKGROUND

1. Field of the Invention

The present invention relates generally to the field of data processing, and more particularly to systems and methods for providing interpretive information for objects distributed in a facility. The present invention also relates to electronic game devices.

2. Description of the Background Art

Museums, galleries, and other facilities that display objects for viewing and appreciation typically need to present interpretive information to visitors about the displayed objects, whether they are paintings, sculptures, air planes, or animals. Each visitor will typically be interested in different objects, and have their own level of motivation and ability to learn about the objects on display. One type of visitor touring a museum may wish to learn about a specific artist or painting, or more generally about a period in art history, or style of painting. Other visitors prefer to tour the museum at their leisure, viewing some objects, passing over others. For those works they do view, they may wish to learn only general information about the work, but on occasion may desire more detailed information about the artist, and the like.

Other visitors prefer to be guided through the museum on a tour of selected objects, but still have the ability to obtain detailed information for works in which they are interested. Such visitors may want to select a tour of a specific type of art, such as paintings, or sculptures, and may desire a specific length of tour, such as a half-hour or hour.

Finally, there exists an entire class of potential visitors, particularly adolescents, who do not visit museums because of a perceived lack of enjoyment or excitement in traditional museum touring. Any museum that can entice such individuals can increase its patronage, and ultimately its profitability. These visitors are typically more interested in game oriented activities, and thus would prefer a tour that provides information through a game format.

To satisfy the needs of these various types of visitors, a museum needs to make touring a museum and learning about its exhibits easy, enjoyable, and adaptable to the spectrum of different visitors.

Museums and the like have typically provided text based products, such as catalogs, brochures, or fixed placards, that describe the objects on display in order to provide visitors to information about the exhibits and objects. The catalogs are carried by the visitor who must read an entry for each exhibit she views. Because of limitations in the size and amount of text that can be included in the catalog, the information provided may not be sufficiently detailed for any given exhibit, artist or period to satisfy the visitor's needs. The catalog, while adequately discussing a specific work, may not provide a sufficient discussion of the artistic period, or the artist's background. Further, while some visitors may enjoy reading long detailed passages on each work, other visitors may only want a brief analysis and description. Thus, a great many tradeoffs must be made in the catalogs in order to suit the varied needs of the visitors. Fixed placards, placed near each object, also have the same limitations as catalogs, in the amount of text, the level of detail that can be provided, and the ability to entice visitors to read them.

Historical, scientific, and other museums generally have a diverse variety of media, including graphics, videotapes, and other modes of display, to both convey information about exhibits to visitors, and to engage visitors in the touring process. These media generally are fixed to a specific object or group of objects in the facility, and again can only provide a selected amount of information and detail to the visitor. The visitor typically choose whether or not to read or view the entirety of the provided interpretive material based on its perceived length. The visitor generally has little or no way to control the amount of explanatory material they view. Other visitors may not be interested in reading a catalog, placards, or other media at all for any number of reasons, and thereby do not receive any type of interpretive information from the museum.

Accordingly, because of the diversity of visitors and their differing needs for interpretive information, and interest in obtaining the information, it is desirable to provide an interpretive device that allows the visitor to select the type, amount, and level of information they receive about objects in the museum. In order to engage visitors who are disinclined to read any material, or who are otherwise not disposed to visit museums, it is desirable to provide an interpretative device that transforms a museum tour into a challenging, interactive and participatory game.

The types of information media generally provided by museums and the like are predominantly visual, and require the visitor to either read, or at least view, a text or graphic item that is separate from the object of interest. This interpretive process, however, has two significant problems. First, if the visitor is reading or viewing a graphic, they are not viewing the work itself, and thus may have to refer back and forth from the text to the object repeatedly. Second, and more importantly, visual media precludes visitors who are blind or visually impaired from fully appreciating and learning about the works. The Americans with Disabilities Act now requires museums to make their facilities accessible to all persons, including the visually disabled, and thus visual based media is insufficient to fulfill this requirement.

An appreciation of these problems has led to a variety of interpretive devices that provide audio recordings that can be listened to while the visitor tours the facility. For example, a standard cassette player can be equipped with a headset for personal use, and provided with a prerecorded tape. A tour of the facility describing specific objects in a specific order is prerecorded and the museum patron proceeds along a preset path defined by the recorded tour. Since the tour is audio based, there is no need for the visitor to read while viewing the object, and the visitor can listen to the tape and observe the work simultaneously. Further, the audio format is beneficial to those visitors with visual difficulties. However, because of the limitations of recorded tapes, the visitor has no ability, using the tape, to obtain information about objects that are not described on the tape. Further, because of the very limited capacity of audio tape, such tapes typically provide only general information about a work or artist, and the visitor is unable to obtain further detailed information from the device about selected objects or exhibits of particular interest. Providing very extensive detail for all objects results in an intolerably slow tour, and providing too little information fails to satisfy many visitors' needs for interpretive information. Finally, some visitors may find tape tours uninspiring in content or presentation, or confining of the visitor's freedom to roam the museum. Even with these limitations, taped tours have become a predominant form of interpretive device, and are used by many museums throughout the world.

Other forms of audio-based interpretive devices have also been employed. One such device is a handheld unit resembling a straightened telephone receiver, known as a radio wand. The unit receives localized radio broadcasts of commentary about specific objects in the museum. Wires placed in the floor and area around a specific object act as an antenna that transmits the recorded commentary into a zone around the object. When the visitor enters the zone, the unit receives and amplifies the recorded commentary. Patrons can walk freely through the museum and listen to narratives for exhibits in whatever order they want. However, since a radio signal is broadcast information it typically can not be individually disseminated for several different exhibits which are close to one another, such as in an art museum. Because of the prerecorded format, there remains the limitations on the amount and detail of information that can be provided. Further, the visitor has no way to control to amount of information delivered for a specific object, other than choosing whether or not to listen to the entire commentary for an object. Also, because the commentary is radio broadcast the sound quality is generally of limited fidelity. While attempts are typically made to hide the wires under the carpet or in the ceiling or lay them directly on the floor, museums are adverse to this because it is logistically difficult to place the many wires needed and, in many cases, unsightly.

Other interpretive devices are derivative of the above described radio wand, and include the random access based devices. These devices store information about exhibits; the information is accessed through a numeric keypad by entering corresponding index numbers located on the artwork. These devices are limited in that the visitor has access to general information and must follow a voice-mail-like system that presents them with other information retrieval options. At the end of listening to the general information relating to an object, for example, the visitor would have to listen for the audible cues directing them to push one of a selection of index numbers. The indexes direct them to hear information broken down into specific categories, such as biography. The visitor must typically carry a chart that illustrates the branches of information available in the device, and how to access particular items. In practice, these systems have limited capability for branching to one or two categories of information due to the unwieldy nature of menu system or the index entry system. Also, because these wands are radio based, they are not capable of displaying text messages for the hearing impaired. Nor are they programmable by the visitor in order to customize the information retrieved. The devices are not automatically activated by the presence of the wand near a given object, but rather rely on the user to accurately enter index numbers or menu options into the device.

Another form of interpretive device is the recent use of portable CD-ROM (Compact Disk, Read Only Memory) based players to display text and graphic data. The use of CD-ROM format makes it possible to provide a large amount of information to the visitor, thereby surmounting the capacity limitations of audio based products, while also offering the ability to randomly access information, overcoming the linear access requirements of audio products. However, the random access capabilities of a CD-ROM product require an interface that enables the visitor to quickly locate, select, and retrieve the desired information. Conventional CD-ROM based devices have rudimentary menu driven interfaces that require the visitor to make keyboard entries to navigate the menu structure, such as entering an identification number or letter associated with each exhibit in order to retrieve the information related to that exhibit. This keyboard entry system can be difficult for some visitors, and distracting for most, since they must carry a map or other guide that contains the identification numbers, or locate them at each exhibit, and then correctly enter them on the typically very small keyboards. The audio output for this device is delivered through an FM transmitter for in-car usage. The power source is also taken from the car as the device requires substantial electrical power. Current battery technology does not offer enough life to make the unit an effective portable touring device.

Another CD-ROM device, called the Gallery Guide™ from Antenna Audio Tours, has a very small screen capable only of handling up to 33 characters scrolled across that screen in a linear fashion. This type of display is not adequate for complex menu selections and therefore this device also uses audible cues similar to the phone-mail-type menu system described above. The portable CD-ROM then acts as a random access memory device similar to the random access radio wand, but it is more difficult to update information, since a new CD-ROM must be mastered for each update of the museums exhibits. In addition, the Gallery Guide provides only a fixed set of tours that are preprogrammed by the museum, and not modifiable by the visitor, or adaptable to the preferences of the visitor.

In addition, CD-ROM players are fragile, and typically not designed for the high volume of use necessitated in the touring environment. For successful use, any portable electronic interpretive device needs to be battery powered, but the mechanical nature of CD-ROM players reduces the effective battery life of such devices.

There are various other design features that are not yet found in existing interpretative devices. Museums are often visited by groups of associated individuals, such as a school or class, or a tour group. Current interpretive device offer no means for providing interconnectivity between group members and adaptable presentation of information to the group members.

Museums generally have both permanent and changing exhibits, the latter designed to bring back patrons for repeated visits. However, current interpretive devices do not allow the museum to develop and store a profile of each user, such that the museum can determine which types of exhibits are of interest to a given visitor, and thereby provide customized information to repeat visitors informing them of new exhibits that they have not seen, or other information of interest, based on the visitors profile. Finally, existing devices do not assist the museum in managing traffic flow through the museum, and reducing congestion in selected areas.

Accordingly, it is desirable therefore to provide an interactive interpretive device that affords the benefits of the audio format, including its non-distractive character, and its usability by the visually impaired, without the limitations on the amount and detail of information that can be provided to the visitor.

In addition, it is desirable to provide an interpretive device allowing for random access of information similar to a CD-ROM player without the physical limitations of CD-ROM players, including mechanical complexity, the need for keyboard based entry, and the lack of audio output capabilities in most operating environments.

Furthermore, it is also desirable to provide any easy to use interface for allowing the visitor to program and customize the retrieval of information to suit their needs. It is desirable to make such a device interactive where a visitor could manipulate the retrieval characteristics of the device, customize its performance, as well as have the unit logically identify the visitor's needs, thus creating a more effective learning and interpretive tool. The random access nature of the device and the interactive design should provide for any variety of user constructed tours, and further allow for challenging, game like tours that stimulate and entice the visitor to locate exhibits to answer questions, or otherwise respond to the device, instead of merely passively using it.

It is also desirable to provide an interface that allow rapid selection of information based on category, and also allows a hearing impaired visitor to access detailed information.

Another problem facing museums and similar facilities is the regulation of visitor traffic throughout the museum. Typically there will be several places in a museum that create bottlenecks, either due to physical limitations on the size of various areas, such as small exhibit halls, or poorly planned connecting passages, or due to visitor interest in new or exciting exhibits. Currently, traffic managment is done statically by constructing the museum to cause traffic to flow in particular patterns, by carefully arranging exhibits, and by other static devices which do not adapt to current traffic levels, nor account for historical variations in traffic patterns. Accordingly, it is desirable to provide a system that allows a museum to track the number and location of its visitors in real time, and to control their movement through the museum.

Currently, museums have a little or no ability to track the specific exhibits that each visitor sees, in order to know what exhibits or object are of interest to each visitor, and to use that information to develop further exhibits, or update the visitor on a later visit as to new exhibits that the visitor may find interesting. Accordingly, a desirable interpretive device should allow the development of visitor profiles.

Finally, an interpretive device should provide for group interconnectivity, allowing members of a group of visitors using the interpretive device to send information to each other, and providing for a group leader, such as a tour guide, with the ability to provide the same information to all group members.

SUMMARY OF THE INVENTION

A system for providing interpretive information about a plurality of objects includes a plurality of object identification devices, each located at an object or group of objects, and a personal interpretive device comprising a storage device, a receiver, a processor, a display, and an audio output device. An object identification device transmits an object identification signal identifying the object at which it is located. The receiver in the personal interpretive device receives the object identification signal and provides it to a processor, which retrieves information about the object associated with the signal from the storage device containing stored information about each of the objects, variously referred herein to as "object information." The processor provides the display with text and graphic data for displaying, and the audio output device outputs any included audio data.

The personal interpretive device further provides a memory for storing an identifier of each object for which information is retrieved, and a an object set comparator for comparing the identifiers stored in memory with a predetermined set of identifiers for other objects, to cause the retrieval engine to retrieve information comparing the objects corresponding to the predetermined set of identifiers.

The personal interpretive device also provides an information selector for selecting a level of information for each object, including general object information and detailed object information, and an information counter for tracking the level of information retrieved for each object, such that the information selector causes the retrieval engine to retrieve detailed information for an object when a count of the object identifiers for which detailed object information is retrieved equals or exceeds a predetermined value. These mechanisms allow the personal interpretive to adapt to a visitor's information needs by modifying the level of information retrieved based on previous patterns of retrieval.

The personal interpretive device further includes a text marker for marking text data, and storing a signal representative of the marked text, the processor capable of outputting the marked text data.

An anti theft component of the system is provided by a base signaling device that transmits to the receiver a signal for determining that personal interpretive device is coupled to the base signaling device, a timer for controlling a timing function of an elapsed time beginning when the personal interpretive device is uncoupled from the base signaling device, and a termination module for terminating the operation of the receiver when the elapsed time equals or exceeds a predetermined usage time. A warning device may display a warning on the display when the elapsed time equals or exceeds a predetermined warning elapsed time. The termination module is coupled to the display for terminating the display of text data. Also, the base signaling device transmits to the receiver a signal representative of the predetermined elapsed time.

The personal interpretive device also provides a user level selector for selecting the user level for the device, such that the retrieval means only retrieves object information of the selected user level. The personal interpretive device provides a synchronization module for synchronizing the output of text data on the display and audio data from the audio output device.

A method for retrieving interpretive object information includes disposing an object identification device at each of a plurality of objects, transmitting an object identification signal from each object identification device, receiving the object identification signal with a receiver, retrieving stored object information for the object identified by object identification signal, displaying the object information on a display, and outputting any audio data included in the object information.

The method includes storing in memory an object identifier for each object for which object information is retrieved, and comparing the stored object identifiers with a predetermined set of object identifiers, and retrieving object comparison information where the stored object identifiers match the predetermined set of object identifiers. Further, the method includes storing the level of information retrieved for an object with the object identifier, and retrieving detailed object information for an object where a count of the object identifiers for which detailed object information was retrieved equals or exceeds a predetermined threshold amount.

The method steps may also include marking retrieved text data included in the object information, storing a signal representative of the marked text data, retrieving the marked text data according to the stored signals, and outputting the marked text data.

The method also includes an antitheft process by transmitting a signal to the receiver to determine if the personal interpretive device is coupled to a base signaling device, initiating a timing function to determine an elapsed time beginning when the personal interpretive device is uncoupled from the base signaling device, and terminating the operation of the personal interpretive device when the elapsed time equals or exceeds a predetermined usage time. A warning may be displayed when the elapsed time equals a predetermined warning elapsed time.

The personal interpretive device also provides a tour structured around a game theme, such as a treasure hunt, cross-word puzzle, or the like. A game tour is produced by selecting determining an objective, such as locating an object or scoring points. The personal interpretive device retrieves and displays object information as clues to the identity or location of selected objects. The visitor must locate the object or provide responses to questions about the object. Additional questions or clues are provided until the visitor meets the objective, such as locating some final object, or answering a specific number of questions. A summary of the visitors' performance is then provided. Additionally, the clues for objects may be obtained by creating a path of objects in the facility, and retrieving clues about a current object on the path, such the at the visitor has to follow the path, treasure hunt-style, to locate some object, or fulfill some other objective.

A touring function is provided by selecting and storing an object type, selecting a set of objects having the selected object type, and storing the object identifiers for the set of objects in a memory, comparing the object identifier of an object for which an object identification signal is received with the stored object identifiers, and retrieving selected object information for the object if the object identifier is one of the stored object identifiers.

BRIEF DESCRIPTION OF THE DRAWINGS

FIG. 5A–5E are illustrations of selection screens appearing on the display of the personal interpretive device 101.

DESCRIPTION OF THE PREFERRED EMBODIMENT

System Overview

Figure 1:
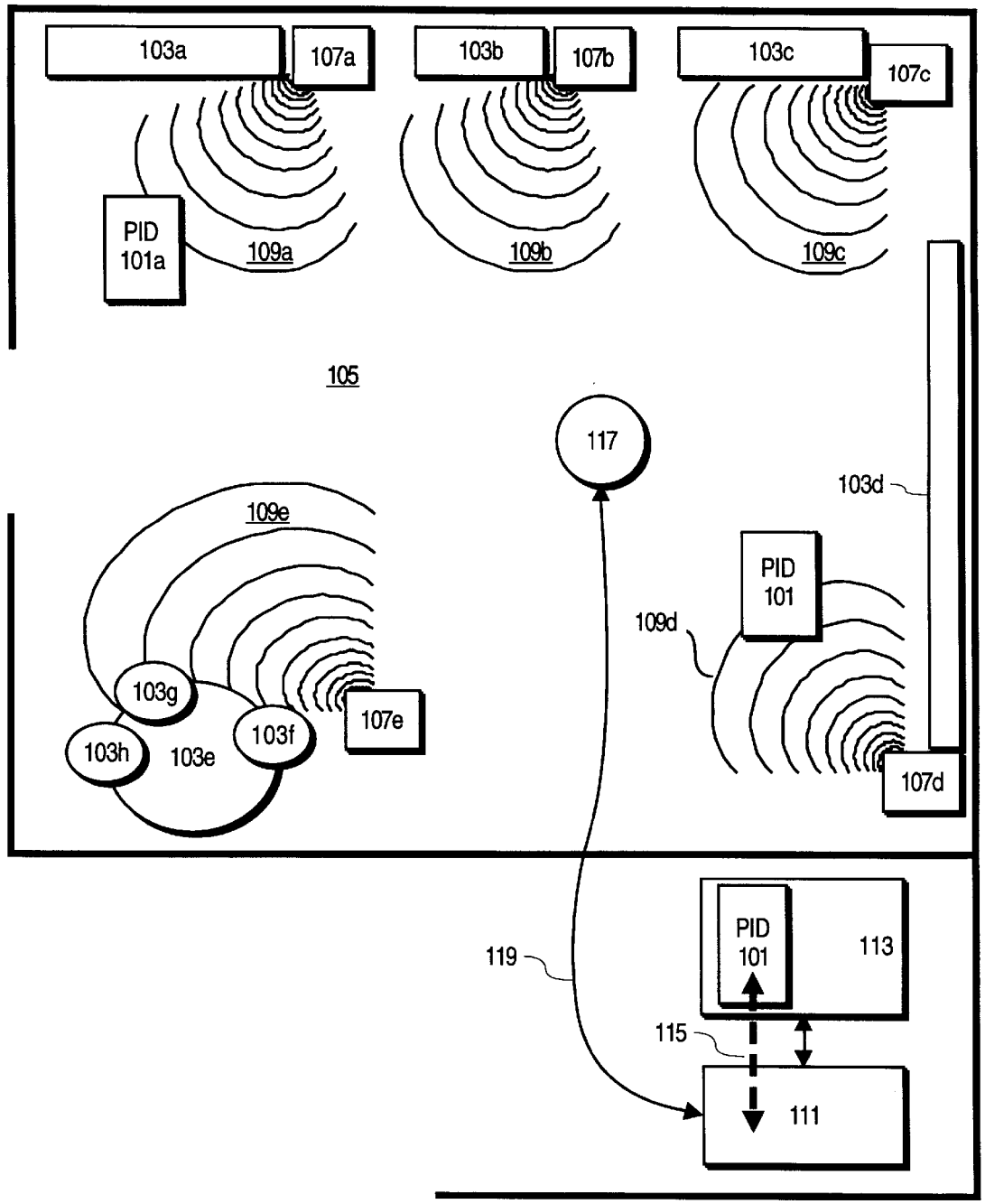
FIG. 1 is an illustration of the system for providing interpretive information about objects 103 using personal interpretive devices 101 receiving object identification signals 109 from object identification devices 107 disposes at various objects 103.

Referring now to FIG. 1, there is shown a system 100 for providing to a visitor interpretive information for various objects 103 displayed in a museum hall 105 using an electronic, portable, personal interpretive device 101. The personal interpretive device 101 retrieves and outputs text and audio information describing and interpreting each object 103 in response to signals 109 identifying each object 103. The description of the system 100 will refer to its use in a museum, but the system 100 can be employed in any environment where users need to retrieve information related to specific objects or locations, such as galleries, amusement parks, exhibit halls, and the like. The system 100 is adaptable to non-entertainment contexts, such a firefighters, repair persons, office managers, and others locating specific objects in buildings or other facilities.

In one preferred embodiment of the invention, the system 100 comprises a number of object identification devices 107, each disposed at an object 103 of interest in the museum, and any number of the personal interpretive devices 101, for distribution to visitors of the museum. Each object identification device 107 continuously broadcasts, over a limited range, an object identification signal 109 identifying the object or set of objects 103 at which the object identification device 107 is disposed. The range of each object identification device 107 can be adjusted so that there is relatively little overlap between the signals 109 of different object identification devices 107. In the preferred embodiment, the object identification devices 103 transmit an infrared signal, but other electromagnetic or optical signals can be used, so long as such signals do not substantially interfere with each other, or existing systems, e.g. security systems, in place in the facility.

Various configurations of the object identification device 107 and system 100 are possible. For example, in another preferred embodiment of the invention, there is one object identification device 107, or kiosk 117 in each room or hall 105 of the facility that transmits a signal identifying the hall. The personal interpretive device 101 determines the objects 103 that are available based on the hall the visitor is in. The visitor then selects information to be retrieved for various objects 103 in the hall 105 using representative icons or softkeys displayed on the personal interpretive device 101. In an alternate embodiment, the object identification device 107 can be triggered by a switch located near the object 103 associated with the object identification device 107, such that the visitor activates the object identification device 107 by engaging the switch, whereon the object identification device 107 then transmits the object identification signal 109 to the personal interpretive device 101.

Also shown in FIG. 1 are a storage base 113 for storing and recharging the personal interpretive devices 101 when they are not in use by a visitor to the museum, and a base computer 111 for programming and maintaining the personal interpretive devices 101 as needed. The base computer 111 is coupled to the kiosk 117, either directly through a physical connection, or by awireless communication network to transmit and receive therefrom various control signals.

Object Identification Device

Figure 6:
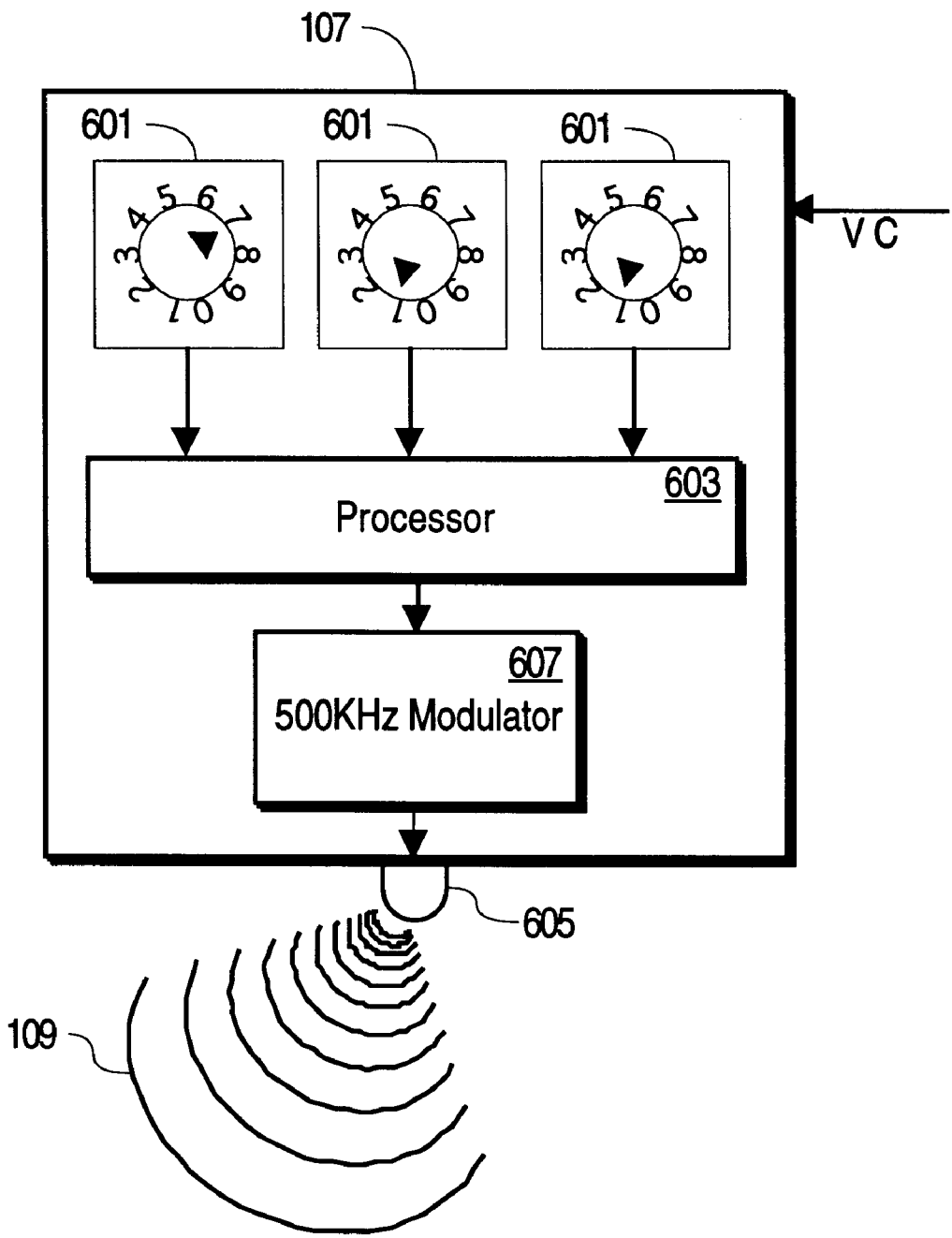
FIG. 6 is a block diagram of an object identification device.

FIG. 6 shows a block diagram of one embodiment of an object identification device 107. In this configuration, the object identification device 107 comprises three miniature switches 601, a microcontroller 603, a modulator 605, and an infrared LED 607. The switches 601 can be rotary switches, as illustrated, or any other like multiposition switch or encoding device. Three switches are used in this embodiment, allowing identification of 1000 distinct objects 103. If it is necessary to identify additional objects, additional switches 601 can be employed. Several times per second the microcontroller 603 reads the positions of the switches 601 to determine code to be used for the object identification signal 109. The microcontroller 603 takes the code and creates a data packet containing a start byte, a packet size byte, one byte for each switch 601 value, a checksum byte, and an end byte. The microcontroller 601 passes the data packet to the modulator 605 to modulate the signal 109 by a preset carrier frequency, preferrably at approximately 500 kHz, in order to facilitate noise rejection. The modulator 605 provides a the signal 109 to the LED 607 which outputs the signal 109 as described above.

Personal Interpretive Device

Figure 2:
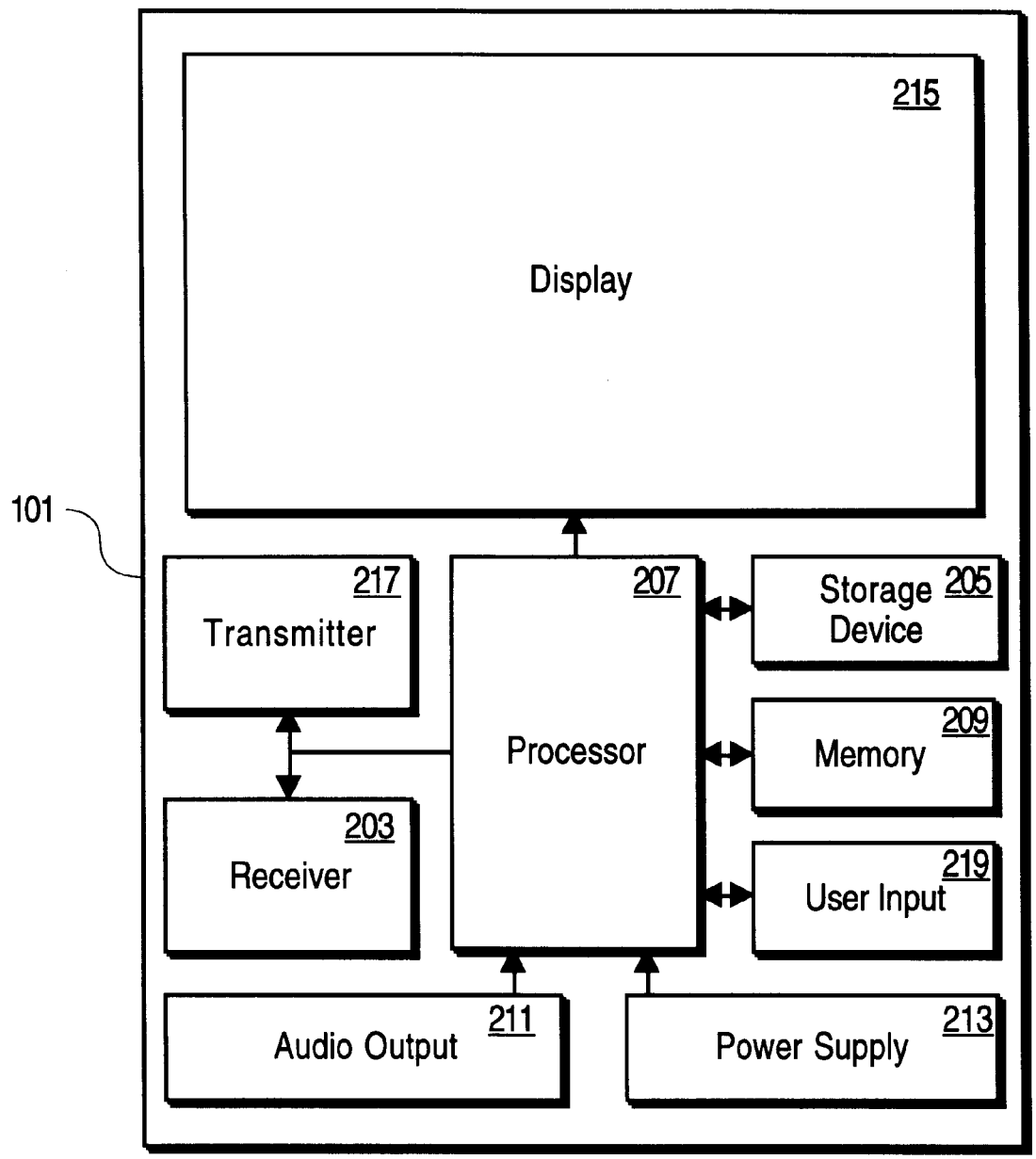
FIG. 2 is a block diagram of the personal interpretive device 101.

FIG. 2 shows a block diagram of a personal interpretive device 101. Each personal interpretive device 101 is a handheld, portable unit that receives a signal 109 from any of the variously located object identification devices 107. The personal interpretive device 101 comprises a number of elements, including a receiver 203, a storage device 205, a memory 209, a processor 207, a display 215, a power supply 213, a transmitter 217, a user input device 219, and an audio output circuit 211. The personal interpretive device 101 used in one preferred embodiment is based on commercially available personal digital assistants, such as the Zoomer™ manufactured by the Casio Corp., or the Newton™ manufactured by Apple Computer.

The receiver 203 continuously seeks for signals 109 broadcast by an object identification device 107 as the visitor tours the museum hall 105, moving in, through and out of the broadcast range of various object identification devices 107. The processor 207 retrieves from the storage device 205 information about the object 103 identified by the received signal 109, and outputs that information for viewing and listening by the visitor.

The receiver 203 is configured to accept the strongest signal 109 it receives so that it will generally receive and lock onto the signal 109 transmitted from the closest object identification device 107, which will most likely be at the object the visitor is currently viewing. For example, in FIG. 1, personal interpretive device 101a will lock onto and receive the signal 109a from an object identification device 107a. Once a signal 109 is received, the processor 207 checks the data packet contents for consistency and verifies that the checksum byte is correct. If the data packets contents are correct, the processor 207 will retrieve object information for the object 103 corresponding to the code sent by the object identification device 107 at the object 103. If the data packet is not valid, the processor 207 will ignore it.

Once the visitor is done viewing a specific object 103, and moves to another one, the receiver 203 will pick up the signal 109 transmitted by the object identification device 107 at the next object 103. Thus as the visitor moves from a first object 103a to second object 103b, the personal interpretive device 101 seeks and then receives the signal 109b from the object identification device 107b disposed at the second object 103b.

Coupled to the receiver 203 is a storage device 205 for storing a number of data files 400, each data file 400 containing information on a specific object(s) 103 in the museum hall 105 at which there is an object identification device 107. In a preferred embodiment, the storage device 205 is a PCMCIA flash memory card. In alternative embodiments, the storage device 205 can include a any non-volatile memory device, such as a miniature hard disk, or a remotely situated server that provides a common database of information for all of the personal interpretive devices 101 in operation, with the data files 400 being transmitted from the storage device 205 to a personal interpretive device 101 as requested via an appropriate wireless communication protocol and medium. The data files 400 are preferably stored in a compressed format, using commercial compression software, such as the program Human Speech Compression™ from Microlytics, Inc. The compressed data is decompressed using the compression software as the data is retrieved from the storage device 205 by the processor 207. The data files 400 can be updated with new information when the personal interpretive device 101 is stored in the storage base 113 and connected to the base computer 111.

Figure 4:
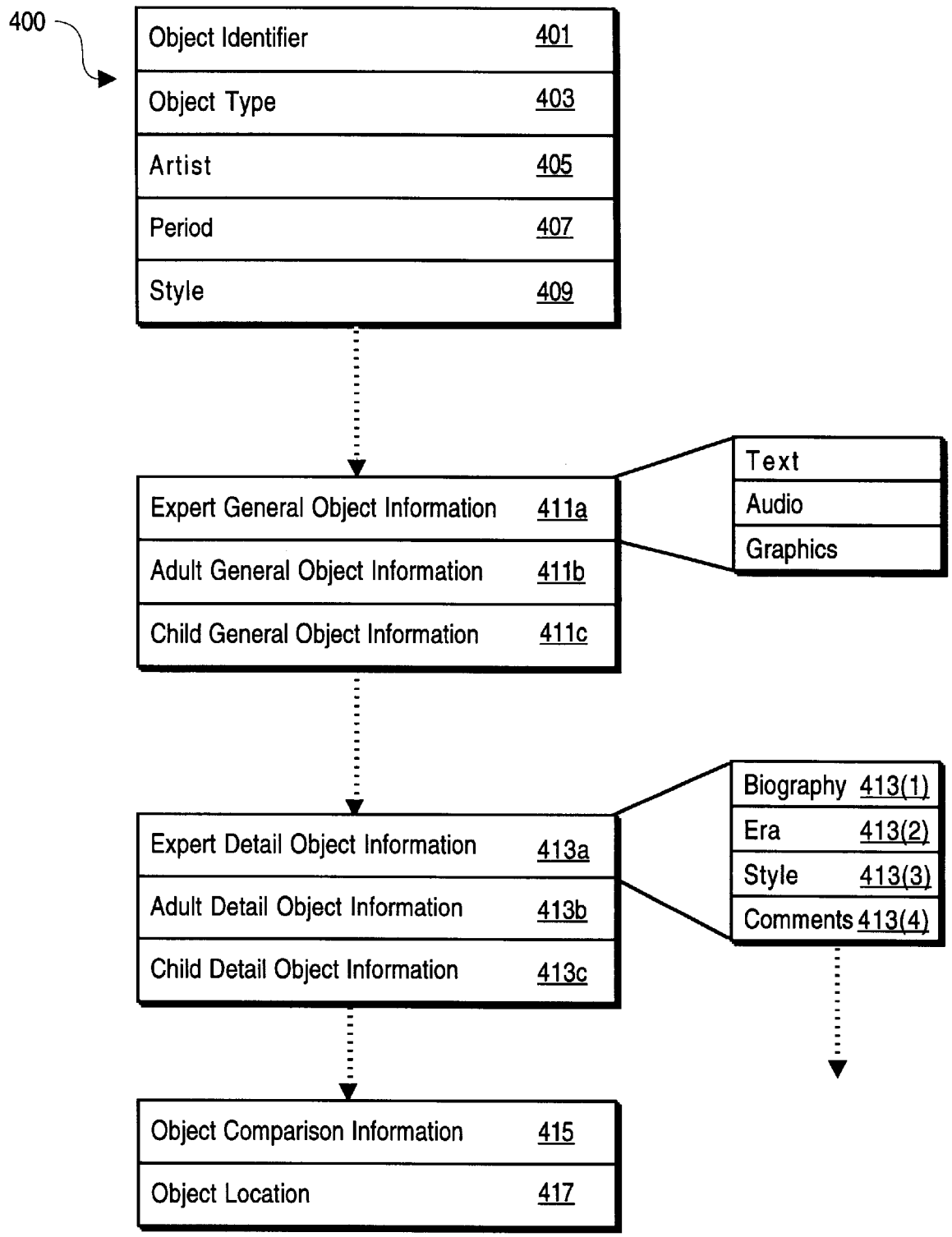
FIG. 4 is an illustration of the structure of data files 400 containing object information.

Referring now to FIG. 4, there is shown the basic structure of the data files 400 stored in the storage device 205, as could be used in an art museum; other data structures can be used for different types of information, as appropriate to the context in which the system 100 is used. The information about each object 103 stored in the data files 400 includes text and graphic images and audio recordings. The data file 400 of each object 103 includes an object identifier 401 so that the object information can be retrieved when the object identifier 401 is provided to the processor 207. Various attributes of the object 103 are stored including, for example, the object type 403, the artist 405, the period 407, and the style 409 of the art work; other additional attributes may also be included, as indicated by the dotted line. The data file 400 for each object 103 also includes general object information 411 that provides a general description of a given object 103, and various types of detailed object information 413 about the object 103. In an art museum, for example, the detailed object information 413 can include information about the artist's biography 413(1), the historical period 413(2) during which the art was created, the style 413(3) of the art, or interpretive comments 413(4) by an art expert or historian. Other types of detailed object information 413 may also be stored as appropriate. The object information also is segregated into different user levels, such as child, adult, or expert, and the like, so that object information for the appropriate target audience can be retrieved as desired. These various classifications allow a tour of specific objects 103 to be constructed, such that the visitor can retrieve the object information associated with only those objects 103 having certain desired characteristics, such as a tour of only 19th century sculpture. Also, included in the data file 400 is object comparison information 415 which compares the object 103 with selected other objects 103. Object location information 417 identifies where in the museum or hall 105 an object 103 is located, to provide information, either textual or graphical, to the visitor for locating a specific object 103. Access to the various types or levels of object information can be configured with the base computer 111 prior to the personal interpretive device 101 being distributed to a visitor, in accordance with some function, such the duration of the visitor's intended visit.

Figure 3:
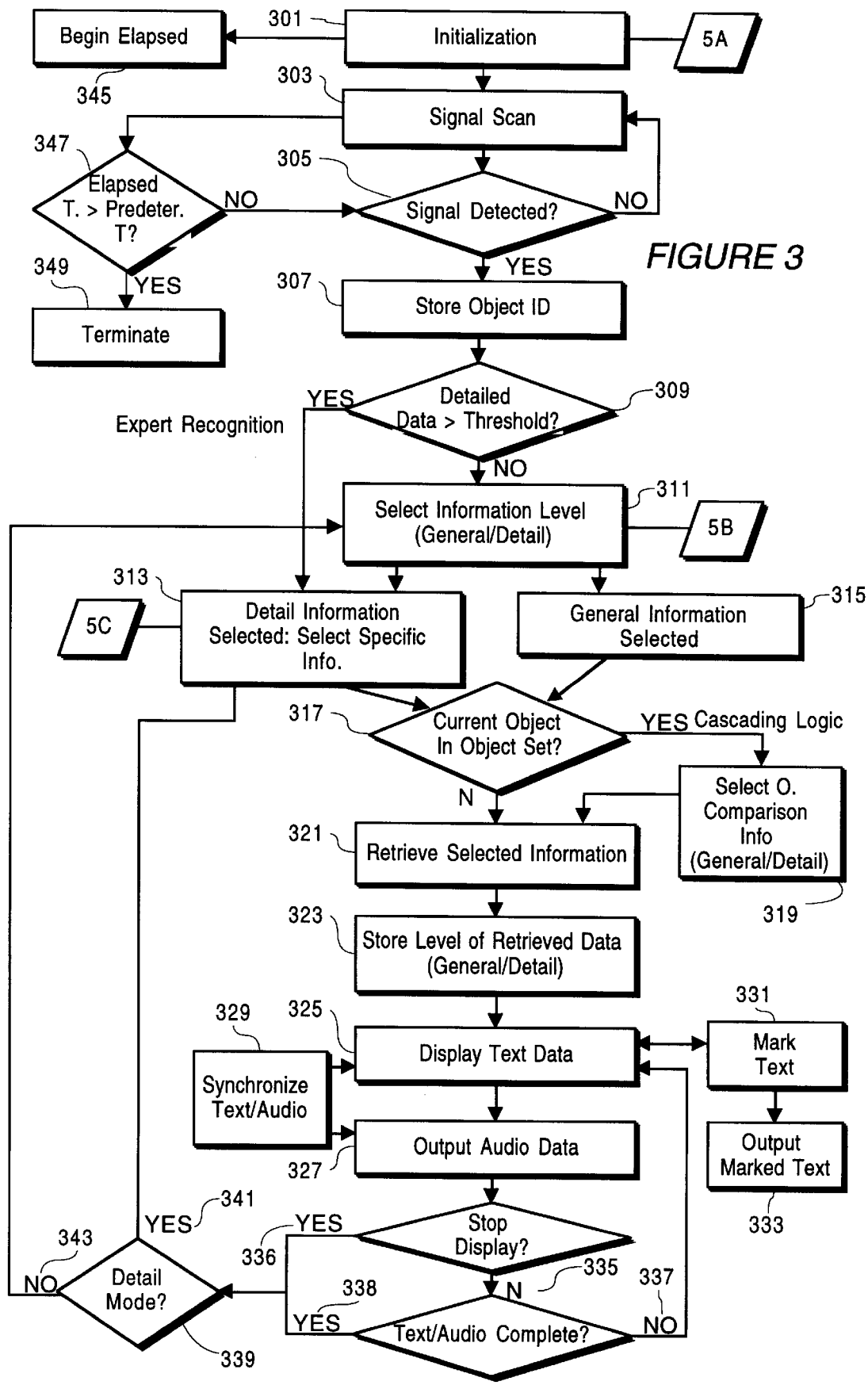
FIG. 3 is a flow chart of the operation of the personal interpretive device 101.

The processor 207 is interconnected with the various elements of the personal interpretive device 101, to provide operational control over the elements, and to provide a number of specialized data processing functions using programmed instructions stored in the storage device 205. The operation of the processor 207 is shown in the flowchart of FIG. 3. Briefly, the processor 207 retrieves 321 object information stored in the storage device 205 for an object 103 after an object identification signal 109 is received 305 from an object identification device 107 disposed at the object 103. The processor 207 outputs 325 the text or graphic data included in the object information to the display 215. Retrieved audio data is provided by the processor 207 to an audio output circuit 211 for outputting 327. The processor 207 also provides various antitheft operations to secure the personal interpretive device 101 and monitor its use. The operation of the processor 207 is further described below with respect to FIG. 3.

The processor 207 is connected to a memory 209 for storing various items relating to the object 103 viewed by the visitor. Maintained in the memory 209 is a data table that contains the object identifier 401 of each object 103 for which object information has been retrieved, the level of information retrieved, whether general or detailed, and any text that has been marked by the visitor (marking is further described below). Also maintained in the memory 209 are various settings currently applied to the personal interpretive device 101, such as the user level, an elapsed time of use, and a predetermined usage time. These various data items are further described below.

A display 215 is coupled to the processor 207 for displaying text data, and graphic images, retrieved from the storage device 205, and associated with the object 103 for which an object identification signal 109 is currently being received. The display 215 provides sufficient resolution to display text and graphic images in a clearly readable manner. In the preferred embodiment the display 215 is a contact sensitive liquid crystal display, commonly known as a touchscreen. The touchscreen capabilities enable the display 215 to act as both an input and an output device, allowing the visitor to interact with the personal interpretive device 101 without the need for a keyboard. This feature eliminates the difficulties of keyboard entry that would result from the use of a small keyboard, and provides an intuitive and familiar metaphor for using the personal interpretive device 101. The visitor uses the touchscreen as an input device by touching various graphic and text items displayed thereon to operate a stored computer program controlling the processor 207. The touchscreen embodiment of the display further enables the personal interpretive device 101 to comply with the Americans with Disabilities Act by allowing the display of variable sized icons and sofkeys. Thus, for visually impaired visitors, enlarged icons representing objects 103 may be displayed to aid the visitor in making selections, overcoming the limitations of small fixed size keys typically found on portable computing devices. Several exemplary displays for controlling the personal interpretive device 101 are shown in FIGS. 5A through 5E.

Audio output is useful in aiding visually disabled visitors to understand and learn about a museum's exhibits, and also provides a way to comply with the requirements of the Americans with Disabilities Act. Accordingly, an audio output circuit 211 is coupled to the processor 207, and outputs recorded audio data included in the object information stored in the storage device 205. The audio output circuit 211 includes a digital to analog converter to convert the digital format of the audio data to a analog signal, an amplifier for amplifying the analog signal, a headphone jack, and a headphone for allowing each visitor to listen to the audio data without disturbing other visitors. Alternatively a small speaker can be used in place of, or together with, the headphones. In the preferred embodiment, the audio data is a recording of the spoken text included in the text data, or may be recordings of spoken text describing a displayed graphic image. In addition, other types of audio data, such as music, recorded natural sounds, operating instructions, or other appropriate audio information can be included, for playback at appropriate objects 103.

A transmitter 217 is coupled to the processor 207 and is used to send signals between the personal interpretive device 101 and either the base computer 111 or other personal interpretive devices 101. In the preferred embodiment, the transmitter 217 transmits an infrared signal capable of being detected by the receiver 203.

A user input device 219 is also coupled to the processor 207 for inputting visitor selections corresponding to information, such as icons or softkeys displayed on the display 215. For example, the user input device 219 may include a number of keys, each variably programmable to correspond to graphically displayed softkeys.

Finally, a power supply 213 provides electrical energy to power the personal interpretive device 101. In the preferred embodiment, the power supply 213 is a rechargeable battery, such as a NiCd, or nickel-hydride battery, that is recharged while the personal interpretive device 101 is stored in the storage base 113 when not being used by a visitor.

General Operation of the Personal Interpretive Devices

Referring now to FIG. 3, there is shown a flowchart of the operation of the personal interpretive device 101 under the programmed control of the processor 207 to retrieve object information in response to received object identification signals 109 from the disposed object identification devices 107. The personal interpretive device 101 is initialized 301 with a startup routine that configures the personal interpretive device 101 to receive the object identification signals 109, and loads programmed instructions from the storage device 205 into the memory 209 for controlling the processor 207. Initialization also resets in the memory 209 any previously stored settings for marked text, preselected tours, user level, and the like.

Following initialization 301, the processor 207 displays on the display 215 a selection screen, such as that shown in FIG. 5A, allowing the visitor to select various options for touring the museum. These options include a roam mode 501, wherein the visitor roams about the museum choosing which object 103 to view, any of several preselected tours 503 of exhibits in the museum, or a gallery map 505 for locating various exhibits in the museum. The operation of the preselected tours 503 and gallery map 505 options is further discussed below. The selection screen may also provide for selecting a user level, indicative of the visitor's perception of their own level of knowledge, such that only information at the selected user level is retrieved 321 by the processor 207. The appearance of the selection screen in FIG. 5A on the display 215 is indicated in FIG. 3.

When either the roam mode 501 or the preselected tour mode 503 is selected by the visitor, the receiver 203 begins a scan 303 for object identification signals 109 being broadcast by the object identification devices 107 variously located about the museum. The receiver 203 will continuously scan 303 as the visitor moves about the museum, entering and exit various halls 105 or rooms, and coming into the range of various object identification devices 107. Upon detecting 305 a object identification signal 109 the processor 207 decodes the data packet in the signal and determines the object identifier 401. The processor 207 verifies that the checksum byte is correct, and if, the processor 207 stores 307 in the data table in the memory 209 the object identifier 401 for the object 103 associated with the received object identification signal 109. The stored object identifier 401 allows the processor 207 to determine for which objects 103 has object information been retrieved 321.

The processor 207 then determines 309 whether the visitor has retrieved detailed object information 413 for a predetermined threshold number of objects 103 previously viewed in the current exhibit hall 105, by comparing a count of the stored object identifiers 401 for which detailed object information 413 was retrieved 321 with the predetermined threshold. As described above, for each object 103 there is at least two levels of detail in the object information, including general object information 411, and detailed object information 411. The visitor can select 311 what level of detail for the processor 207 to retrieve 321 and display 325. When the visitor has selected 311 detailed object information 413 for at least the threshold number of objects 103 in a given exhibit hall 105, then the processor 207 selects 313 detailed object information 413 for each remaining object 103 viewed in the same hall 105, immediately providing the visitor with a selection screen (FIG. 5C) to choose the specific item 511 of detailed object information 413.

For example, in FIG. 1, assume that four is the threshold number of objects 103, and that the visitor has viewed and retrieved 321 detailed object information 413 for objects 103a, 103b, 103c, and 103d. Then after detecting 305 a signal 109 for object 103e, the processor 207 will automatically display a selection screen (FIG. 5C) for selection of detailed object information 413. This process allows the personal interpretive device 101 to actively track the level of information the visitor is viewing, and adjust to provide that same level of information to the visitor, thereby eliminating the need for the visitor to always choose the detailed object information 413, and tailoring the system's output to the visitor's information needs.

If the threshold for automatically displaying 321 detailed object information 413 has not been reached, then the visitor may select 311 the level of information to be retrieved by the processor 207. FIG. 5B shows the selection screen for this choice, wherein the "Play" option 507 represents general object information 411, and the "More" option 509 represents detailed object information 413. If the visitor selects 313 detailed object information 411, with the "More" option 509, then a further selection screen (FIG. 5C) is displayed to allow the visitor to choose the specific item 511 of detailed object information 413. Alternatively, the visitor may select a "theme" corresponding to one of the specific items 511 of detailed object information 413 such that item is always retrieved 321. For example, the visitor may choose to always retrieve biographical information for the artist of each object 103.

After the visitor selects 311 the level of object information, the processor 207 determines 317 whether the current object 103 is one of a predetermined set of objects 103, based on the stored object identifier 401. The predetermined set of objects 103 can be limited to objects in a specific exhibit hall 105, or of a specific object type 403, such as paintings, or a particular style 409, such as cubist. The object identifiers 401 for the predetermined set of objects 103 is stored in the memory 209. If the object identifier 401 of current object 103 is one of the stored object identifiers 401 for the predetermined set of objects 103, and other objects 103 in the set have already been viewed, then the processor 207 selects 319 object comparison information 415 to provide the visitor with a comparison between the currently viewed object, and others previously viewed in the exhibit hall 105, in addition to the selected general or detailed object information.

For example, assume that in a hall 105 there is a number of paintings 103(a–j) of a given artist, and that the visitor has already viewed and retrieved 321 object information 411 for the first four paintings 103a, 103b, 103c, and 103d, which form part of an artist's early period. A predetermined set of paintings may include various paintings 103b, 103c, and 103e, for which the object identifiers 401 are stored in the memory 209; other predetermined sets may include other selected paintings in the exhibit hall 105. If the visitor then moves to view another painting 103e, then the processor 207 compares 317 the object identifier 401 of the current painting 103e, with the stored object identifiers 401 of the predetermined set, and since the object identifier 401 of the current painting 103e is one of the stored object identifiers, the processor 207 selects 319 the object comparison information 415 of painting 103e. This comparison information will discuss the prior paintings 103b, 103c, and compare them in style, content, and the like with the currently viewed painting 103e. As the visitor moves through the hall 105 and views further paintings 103, the processor 207 compares the object identifier 401 of each current painting 103, and already viewed paintings with the various predetermined sets, and selects 319 for retrieval the appropriate object comparison information 415. The object comparison information 415 may be either detailed or general based on the level of detail the visitor has previously viewed. In one embodiment, a selection screen (not shown) may allow the visitor to select to retrieve either the object comparison information 415 or the general or detailed object information, or any combination thereof. In another embodiment of the invention, the processor 207 could suggest, via prompts on the display 215, objects 103 that the visitor should view based on a comparison 317 the object identifier 401 of the current object 103 with stored object identifiers 401 of the predetermined set.

After either the object comparison information 415, the general object information 411, or the detailed object information 413 is selected 311 for retrieval, then the processor 207 retrieves 321 the selected information from the data file 400 stored in the storage device 205. The retrieval process includes decompressing any compressed data, and storing 323 the level of detail (whether general or detailed) selected for retrieval in the memory 209 with the object identifier 401 of the current object 103. Storing the level of detail provides the data used in the comparison 309 to determine whether the visitor has selected detailed object information 413 for a threshold number of objects 103.

After retrieval 321 the processor 207 displays 325 any text or graphic data included in the object information on the display 215, and simultaneously provides audio data from the object information to the audio output device 211 for outputting 327. As described above, the audio data includes a recording of the text data, thereby allowing visually impaired visitors to appreciate and learn about the current object 103; the audio data may also be recorded music or the like, to be output with the text data. The processor 207 synchronizes 329 the display 325 of the text data with the audio output 327 by scrolling the text on the display 215 in conjunction with the audio data being output. Synchronization may be performed alternatively by a specific logic circuit. A countdown timer may be shown on the display 215 for indicating a remaining time for completing the audio output 327. The visitor also has the option to have only text data provided, without any accompanying audio data. Alternatively, text data may be provided for which there is no accompanying audio data, for example, for specificallly detailed object information.

While the text or graphic data is being displayed 325, the visitor may mark 331 the data for later retrieval and output 333 in printed form, or in other suitable media. Thus if the visitor finds the detailed object information 413 of the artist's biography 413(1) for a particular object 103a, useful for research purposes, for example, the visitor may mark 331 the text data, and later, have the detailed object information 413(1) printed out 333 when the personal interpretive device 101 is returned to the storage base 113 and reconnected with the base computer 111. Marking text data 331 stores in the memory 209 a pointer to the text data of the object information for the object 103. The processor 207 later provides the pointer to the marked text data to the base computer 111 which retrieves the marked text data from its own storage device and outputs 333 the text data.

As the text or graphic data and audio data are being output, the visitor has the option of stopping 336 the output or continuing 335 with the display 215 of the text data and accompanying audio data. If the visitor decides to stop 336 the output, then the processor 207 returns to one of the most recently viewed selection screens, here either the selection screen shown in FIG. 5B or 5C, depending on what level of detail 339 is currently being viewed. If the visitor is viewing general object information 411 then the processor 207 returns 343 to the selection 311 (FIG. 5B) for choosing general 411 or detailed object information 413. If the visitor is viewing detailed object information 413 when the output 325 is stopped 336, then the processor 207 returns 341 to the selection 313 (FIG. 5C) for choosing one of detailed object information 413 items. If the visitor is no longer interest in an object 103 they may return to signal scanning 305 at any time by invoking a return command 508 shown on FIG. 5B, thereby enabling the personal interpretive device 101 to receive object identification signals 109 from other object identification devices 107. Alternatively, a timeout function could return the personal interpretive device 101 to signal scanning 305 after a predetermined time following the reception of an object identification signal 109.

If the visitor does not choose 335 to stop the display 215, then the processor 207 determines whether the text and audio output has been completed 338. If the output is not complete 337, the processor 207 continues to display 325 the text or graphic data, output 327 the audio data, and the synchronize 329 these outputs.

Once the text, audio, or graphic data have been completely output 338, the processor 207 again returns to the most recent selection screen, according to the level 339 of object information that was retrieved 321, in the same manner as in the step of stopping 336 the display of text.

This process of receiving 305 the object identification signals 109, selecting 311 the level of object information to be retrieved 321, and outputting 325 the text or graphic data and audio data continues as long as the visitor desires to tour the museum, or until a timing function 345–349 controlled by the processor 207 terminates 349 operation of the personal interpretive device 101.

The timing function 347–349 is begun 345 during initialization 301 when the personal interpretive device 101 is removed from the storage base 113, and uncoupled from the base computer 111. The timing function 347 provides the personal interpretive device 101 with both an anti-theft mechanism, and a mechanism for regulating each use of the personal interpretive device 101 for such purposes as renting the device for limited periods of time. While the personal interpretive device 101 is in the storage base 113 and coupled to the base computer 111, the base computer 111 provides a control signal 115 to the processor 207 confirming its connection. When the personal interpretive device 101 is removed from the storage base 113, and thus uncoupled from the base computer 111, the processor 207 detects the absence of the control signal 115, and begins counting 345 an elapsed time.

During operation of the personal interpretive device 101, the processor 207 compares 347 the elapsed time to a predetermined usage time. The predetermined usage time is set by the museum staff. When the elapsed time equals the usage time, the processor 207 terminates 349 the operation of the receiver 203 so that it is no longer able to receive signals 109 from the object identification devices 107, or alternatively, may lock out further operation of the display 215 so that the display 215 no longer responds to inputs by the visitor. A warning message can be played prior to termination 349 instructing the visitor to return the personal interpretive device 101 to the museum staff, and indicating the amount of time remaining before the termination 349 of the operation of the personal interpretive device 101. Alternatively, the base computer 111 can transmit, in a manner similar to the object identification devices 107, a control signal 115 that unlocks the personal interpretive device 101, allowing it function for a predetermined usage time as determined by a second signal sent to the processor 207, based for example, on the amount of time for which the visitor has rented the personal interpretive device 101. The processor 207 again terminates 349 operation of the personal interpretive device 101 when the elapsed time equals 347 the predetermined usage time. As a further alternative, when the personal interpretive device 101 is recoupled with the base computer 111, the processor 207 may provide the elapsed time to the base computer 111, which then determines an fee for the usage of the personal interpretive device 101 based on the elapsed time.

Figure 5D:
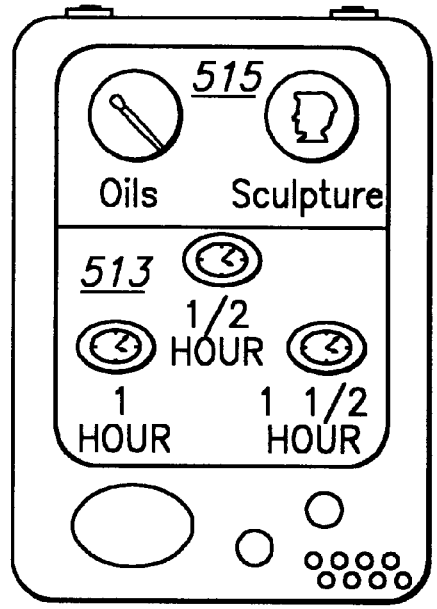

As described above with respect to FIG. 5A, during initialization 301 the visitor may choose a preselected tour 503 instead of selecting the roam 501 option. The preselected tour 503 option provides the visitor with a tour of selected objects 103 in the museum, in a preselected order. As the time required to display 325 the text data and play the audio data included in the object information for each object 103 is known, the number of objects 103 in a tour can be adjusted, such that the cumulative time for reviewing all of the objects 103 meets some desired tour time lengths. Given the number and variety of different objects 103 in a typical museum, any number of different combinations of objects 103 may satisfy the desired tour time lengths, and thus tours can be selected randomly from such different combinations. For example, FIG. 5D shows a selection screen allowing the visitor to choose a tour length 513, including a half-hour, one hour, or one and a half-hour tour. As each object 103 is associated with an object type 403, a tour 515 can be structured to view only objects 103 of a particular type 403; similarly, a tour can be limited to objects 103 of a particular style 409, or a particular art period 407. Accordingly, the processor 207 can compile a tour of a desired length of time for objects 103 having a selected object type 403, based on the cumulative review time for all of the objects 103. FIG. 5D also shows a sample selection for a tour of a selected of object type 403. The object identifiers 401 for the objects 103 included in a tour are stored in the memory 209.

When a tour of specific object type 403 is selected, then the visitor is instructed, via prompts on the display 215, to move to specific exhibit halls 105, and to a specific set of objects 103 therein. There, as the receiver 203 detects 305 the object identification signal 109 of an object 103, the processor 207 compares the object identifier 401 with the object identifiers 401 for objects 103 included in the tour, and if the object identifier 401 is part of this set, then the processor 207 retrieves 321 the object information for the object 103.

Figure 5E:
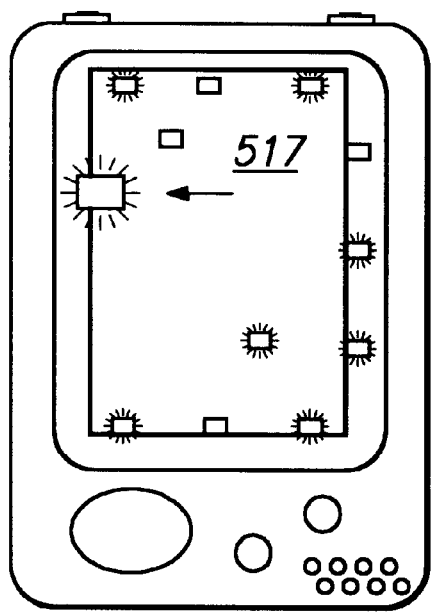

In addition to providing tours or automatic retrieval of object information, the personal interpretive device 101 provides for directed retrieval of object information with a gallery map. A sample gallery 517 map is shown in FIG. 5E.

The gallery map option 505 displays on the display 215 a graphic image depicting the layout 517 of the exhibit hall 105 in which the visitor is currently located, or more general floor plans for the entire facility, at various levels of resolution, such as buildings, wings, halls, and the like. When the gallery map option 505 is invoked, the processor 207 determines from the object information for the currently viewed object 103 the object location 417, and then retrieves from the storage device 205 a gallery map 517 of the hall 105 containing the object 103. The visitor may then elect to review obobject information for other objects 103 iconographically represented on the galler map 517, either by directly selecting them via the display 215, where the display is a touchscreen, or by providing inputs with the input device 219. An alternative use of the gallery map 517 is to allow the visitor to search for a specific object 103 from displayed menus or lists of object identifiers 401, and then displaying a gallery map 517 indicating where in the museum the desired object 103 is located.

Game Tours

Figure 7:
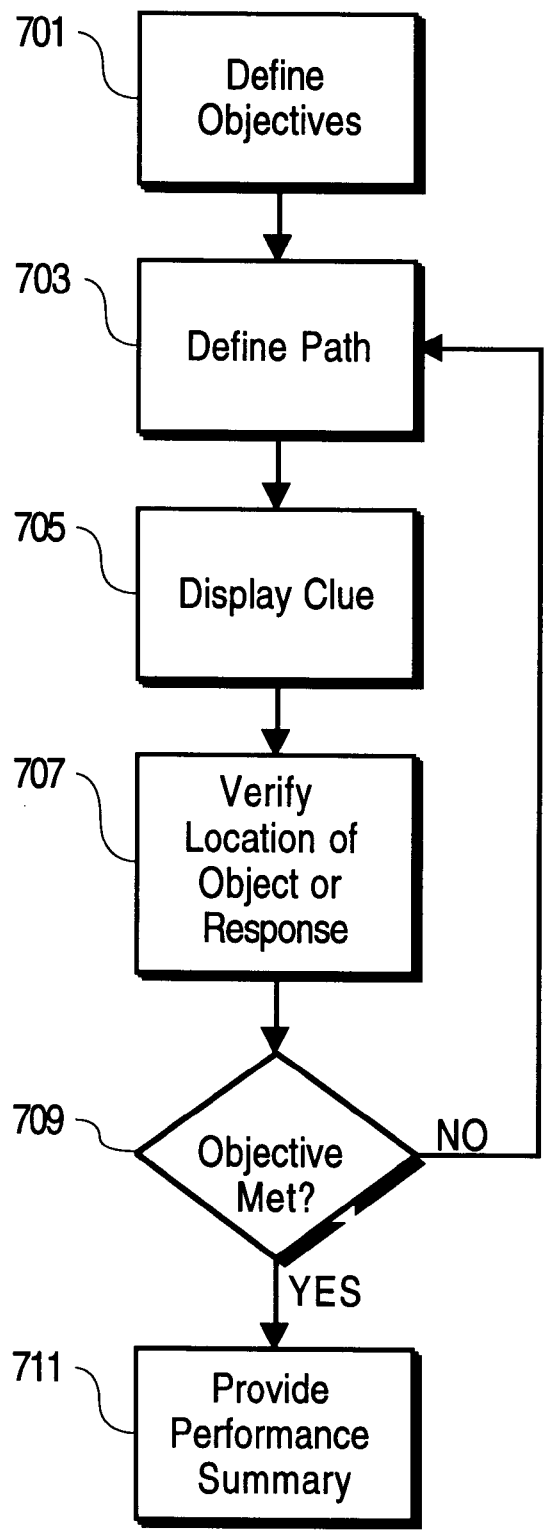
FIG. 7 is a flowchart of the operation of the personal interpretive device 101 during a game tour.
Figure 8:
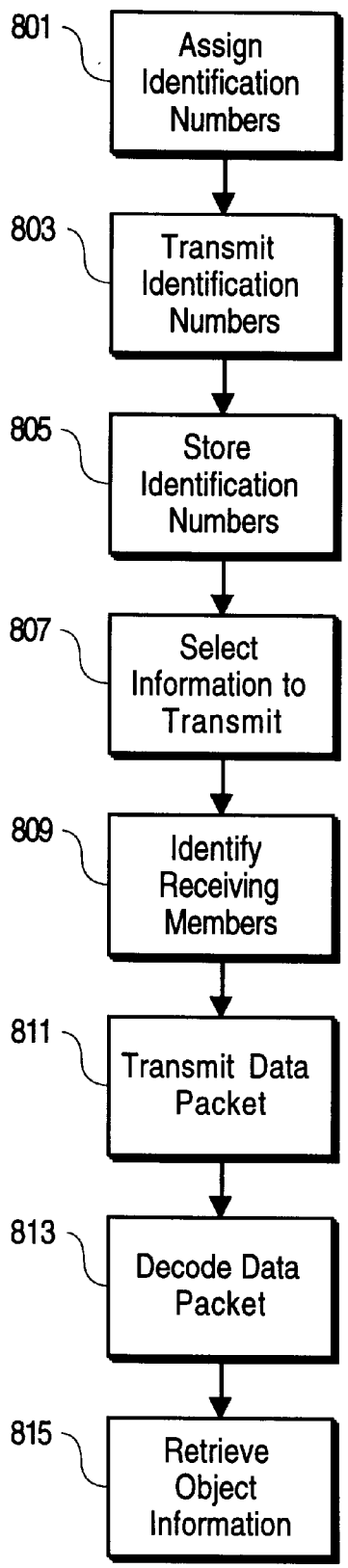
FIG. 8 is a flowchart of the operation of the personal interpretive device 101 to provide group interconnectivity.

As a further embodiment of the present invention, the personal interpretive device 101 can be programmed to provide a game-like directed tour of the museum or facility. FIG. 7 shows the general operation of the personal interpretive device 101 during a game tour.

The personal interpretive device 101 sets 701 the objective for the visitor, typically by displaying on the display 215 a selection screen offering different types of games from which the visitor may select. The objectives derive from the type of game involved, and will typically require the visitor to locate specific objects 103 in the museum, obtain information about the objects 103 based on the object information 411, 413 presented during retrieval 321 and display 325, and respond to questions presented on the display 215 about the located objects. To embellish the objective, various game themes can be employed, such as cross-word puzzles, hangman, treasure hunts, or simple points scoring for correctly answering questions. A more elaborate game theme may include a tracking game, wherein the visitor is attempting to locate a particular object, such as a painting or other object, or person using clues about where the object or person was recently seen or some event involving the person. For example, where the personal interpretive device 101 is employed in an art museum, the game theme may be to track an art thief who has stolen a valuable painting; the clues would direct the visitor through various exhibit halls 105 to locate objects 103 therein for object information 411,413 that provides additional clues to the thief's whereabouts. Where the personal interpretive device 101 is employed in a natural history museum, a similar game theme would be to track a geologist or other researcher that has been lost somewhere in the world. In the tracking type of game, the visitor is successful if the object or person is located.

Based on the objective, the personal interpretive device 101 creates 703 a tour, or path, through the facility or museum, the path identifying specific objects 103 to be located by the visitor. The path can be either randomly generated or predetermined. The visitor is provided 705, through screen displays presented on the display 215, with some information about the objects 103 to be located, either an explicit identification, or some less specific information, or clues. In the preferred embodiment of a game tour, the visitor is provided with information to locate only one object 103 at a time. This allows flexibility in programming design as to whether to randomly define the objects 103 to be located, or to use a preselected set of objects 103. The information displayed to the visitor about a particular object 103 may be provided at one time, or may be presented iteratively in order to guide the visitor throughout the facility to specific halls 105 or other locations.

For example, where the visitor is tracking an art thief, the information may include physical descriptions of an exhibit hall 105 containing the object, directions to a specific location, or questions about the object. When the visitor enters the correct hall 105, the personal interpretive device 101 may provide clues object a selected object 103 in the hall 105, so that the visitor must determine the correct object based on the clues.

As the visitor locates the objects 103 in the defined path, the visitor may provide inputs to the personal interpretive device 101 in the form of selections of answers to questions, or the like. The personal interpretive device 101 will collect and verify 707 the visitor's inputs, comparing the inputs to correct answers or other information. For example, for locating a given object 103, the personal interpretive device may merely compare the received object identification signals 109 to the object identification signal 109 coded for the given object 103 to determine if the visitor has in fact found the correct object. More elaborately, the personal interpretive device 101 may present a screen display with a multiple choice question, based on the object information 411 displayed 325 after the object is located, and verify 707 that the visitor selects a correct response to the question before allowing the visitor to proceed to another object 103. The personal interpretive device 101 may alter the path depending on whether the visitor correctly responds to any questions displayed.

Finally, the personal interpretive device 101 will track the visitor's overall performance, such as the number of correct responses, the amount of time spent, the number of objects located, and the like, to determine 709 if the visitor satisfied the game objectives. If the objective is not met, the game tour continues, with the next object on the path determined 703. If the objective is met, the game tour terminates. The personal interpretive device 101 then provides 711 an overall summary of the visitor's performance, including successful completion of the game, total points scored, and the like.

The game tour can be played by either the visitor alone, or the personal interpretive device 101 can facilitate and manage a game tour competitively played between two visitors, each using a personal interpretive device 101.

Group Interconnectivity

A further feature of the present invention is the provision for interconnectivity of a group of personal interpretive devices 101. With this feature, a group of visitors, each with a personal interpretive device 101, can s all receive the object information 411 for a certain object 103, thereby providing for a group tour of the museum or facility. Group interconnectivity is provided as follows.

Each personal interpretive device 101 in a group is assigned 801 a unique identification number, that allows the personal interpretive device 101 to be distinguished from other personal interpretive devices 101 both in the group and in use by others. The identification number may be input manually when the personal interpretive devices 101 are distributed to the group members, or automatically by the base computer 111. The object identification number may be associated with a visitor's name in order to ease identification by other group members of a particular personal interpretive device 101. At least one of the personal interpretive devices 101 of the group, belong for example to the group leader, is provided with the identification numbers of the other personal interpretive devices 101 in the group. This allows the group leader to control the object information that the group members receive during a tour. Alternatively, all personal interpretive devices 101 in the group can have the identification numbers of the other devices in the group. This would allow any group member to communicate with any other member. The identification numbers are provided between the personal interpretive devices 101 by transmitting 803 them with the transmitter 217. When a personal interpretive device 101 receives the identification numbers of other personal interpretive devices 101 in the group, it stores 805 them in the memory 209. The personal interpretive devices 101 are now able to identify and communicate with each other.

During a tour then, a group member, such as the group leader or tour guide, when the group leader has retrieved object information for an object 103, the group leader can select 807 the specific object information that is to be transmitted to the other group members. This is done by designating the object information using a suitable screen display presented on the display 215. The group member then designates 809 which other members of the group are to receive the object information, by selecting from a suit screen display either the identification numbers of the recipient personal interpretive devices 101, or preferably, the names of the group members using the recipient devices, as previous entered. The transmitting personal interpretive device 101 constructs a data packet having data representing the identification numbers of the recipient devices 101, the object identifier 411 and specific object information 411, 413 to be retrieved. This data packet is then transmitted 811. The receiving personal interpretive devices 101 decode 813 the data packet, in the manner described above, and retrieve 815 the specified object information. Other personal interpretive devices 101 that receive the data packet but that are not identified by the identification numbers included therein will not retrieve the specified object information.

In addition to transmitting the identification of specific object information to be retrieved, other types of information may also be transmitted between group members. For example, two or more units can cooperatively engage in a game tour, wherein each visitor transmits information or clues they have solved to other group members.

In another alternate embodiment for the use of group interconnectivity, numerous kiosks 117, each having a transmitter 207, can be disposed throughout the facility. Each kiosk 117 transmits predetermined data packets identifying specific object information in the area or hall 105 where the kiosk 117 is located. As a group of visitors with the personal interpretive devices 101 approach the kiosk 117, the personal interpretive devices 101 receive the data packets transmitted from the kiosk 117 and retrieve the object information so specified. In this manner all group members are presented with the same object information, providing a unified group tour.

Visitor Traffic Management

Figure 9:
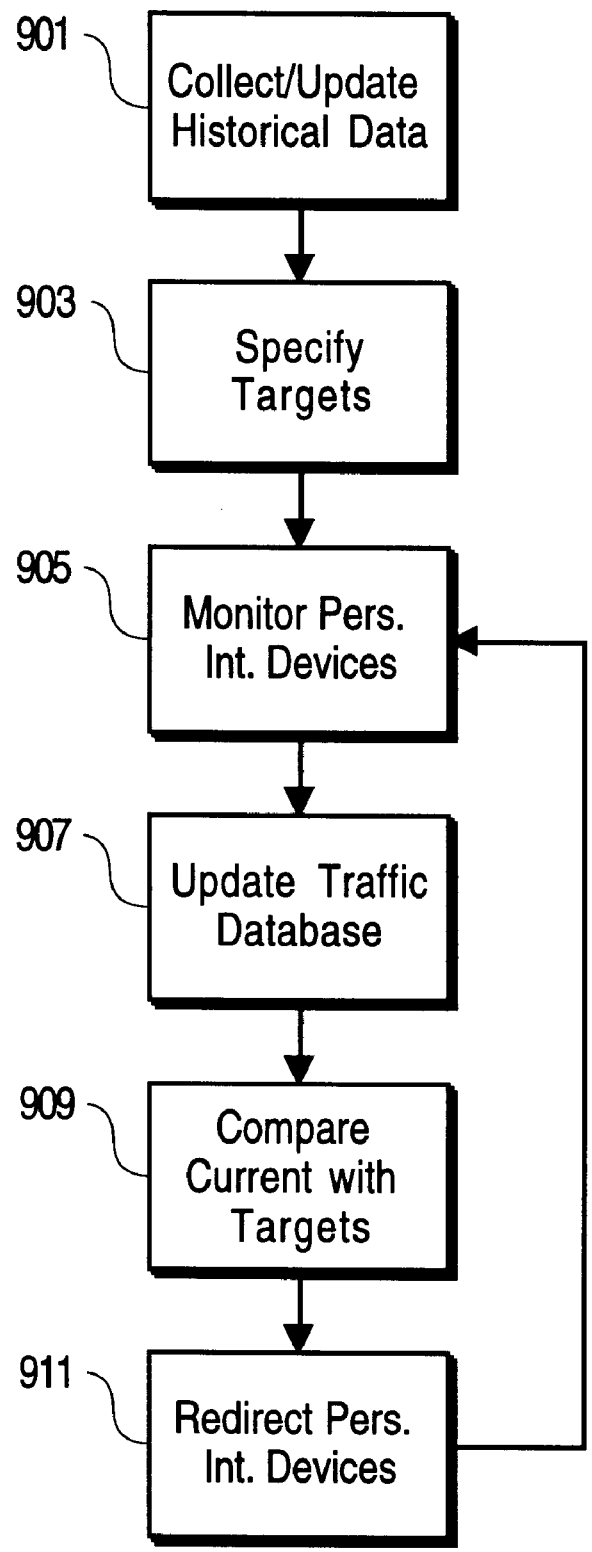
FIG. 9 is a flowchart of the operation of the system 100 during the management and regulation of visitor traffic.

As a further feature of the system of the present invention, the base computer 111, in cooperation with the personal interpretive devices 101, can regulate the flow of visitors through the facility in order to prevent bottlenecks, overcrowding, and the like. This traffic regulation increases overall patronage and utilization of the facility by allowing the facility to more evenly distribute visitors. Referring now to FIG. 9, the base computer 111 collects and updates 901 data for historical traffic patterns throughout the facility. The data can be organized to relate for each exhibit hall 105, and for connecting passages, a representative number of visitors, such an average number of visitors over a selected time interval, such as per day, or per hour. This historical information may be compiled over time, by collecting location and time data from each of personal interpretive devices 101 provided to visitors when the device 101 is returned after use. The base computer 111 would download data from the device 101 indicating the order of the exhibit halls 105 the visitor visited, and the entry and exit times to each hall, the time spent at each object 103, and the date of visit. This information would take into account for variances in season, weather, tour group versus individual behaviors, and other variables.

To regulate the traffic, the base computer 111 accepts inputs specifying 903 a target or optimal number of visitors for each exhibit hall 105, set of halls 105, or other areas, such as a maximum number of visitors allowable at one time in each exhibit hall 105, an upper and lower bound, or some other value or function used to regulate the numbers of visitors in various parts of the facility. The targets numbers can be adjusted as necessary to account for changes in the exhibits, whether certain exhibits are opened or closed, and the like. This information can be continually updated and modified during use to reflect changes in operating conditions as they occur.

During operation, the base computer 111 monitors 905 the location of all the personal interpretive devices 101 currently in use. Monitoring may be performed in a number of ways.

In one embodiment of the system, there is disposed in each exhibit hall 105 a monitoring device, having a receiver similar to the one used in the personal interpretive device 101, coupled (either directly or by a wireless network) to the base computer 111. As a personal interpretive device 101 is being used by a visitor, it will periodically transmit its identification number. The monitoring device detects the identification numbers broadcast by each personal interpretive device 101 in the hall 105 and provide the identification numbers to the base computer 111. The monitoring devices may be disposed in the kiosks 117. The base computer 111 updates a 907 a database of information that details the number personal interpretive devices 101 in each of the facility's halls 105 or other areas.

In an alternative embodiment, the personal interpretive devices 101 may directly transmit to the base computer 111 its identification number along with a signal indicative of the current object 103 being viewd (such as the currently received object identification signal 109), thereby identifying to the base computer 111 the location of the personal interpretive device 101. In another alternative embodiment, the information about the location of the s personal interpretive devices 101 may be manually entered in the base computer 111.

The base computer 111 compares 909 the current number of personal interpretive devices 101 in each of the halls 105 with the target value for each hall. When the number of visitors in a given area reaches the target value, the base computer 111 will transmit 911 from the kiosk 117 to the personal interpretive devices 101 in the area a signal that alters the operating behavior of the personal interpretive devices 101 in order to move the visitor to another area. The base computer 111 may directing each personal interpretive device 101 to predetermined areas in order to disperse the visitors, and reduce the number of visitors in the area. The base computer 111 may instruct the personal interpretive devices 101 to restrict access to certain object information, in order to reduce the amount of time a visitor spends in a given area, thereby increasing throughput. The base computer 111 may also provide information allowing the personal interpretive devices 101 to avoid specific areas of the facility. For example, for visitors using personal interpretive device 101 for a selected tour that includes a hall 105 that is currently at or near its target capacity, the control signal would indicate the location of the hall 105, and the personal interpretive devices 101 would restructure the tours to avoid the overcrowded hall 105. The monitoring and redirection processes operate continuously in a feedback loop to maintain and regulate visitor traffic.

In summary, the present invention provides visitors to a museum or other facility a portable, easy to use device for retrieving information about any number of objects or exhibits in the facility. General information and various types of detailed information can be individually retrieved for each object through the use of object identification devices that each transmit a signal identifying an object that the visitor is viewing. The identification of the object from the signal alleviates the visitor from having to separately determine and input to the device the identity of the object being viewed. The output of text, graphic and audio data makes touring enable both visually and the hearing impaired to obtain the same information about an exhibit. A touch-screen display provides a simple and efficient way of interacting with the device, eliminating the need for a keyboard.

The present invention provides for a game like tour of museum, where a visitor is challenged to locate information or objects in a tour structured around a game theme. The present invention also affords group interconnectivity, allowing individual users of the personal interpretive devices to transmit information to each other, allowing a group to commonly view object information for specific objects, thereby facilitating group tours. The system of the present invention also provides for traffic regulation by monitoring the current locations of the various personal interpretive devices in use, and redirecting visitors to less congested locations.

We claim:

1. A system for retrieving and displaying object information for any of a plurality of distributed objects, each object associated with object information, the system comprising:
   a plurality of object identification devices, each object identification device disposed near at least one object, and transmitting an object identification signal identifying the object or objects near which the object identification device is disposed within a transmission area;
   a personal interpretive device, comprising:
      a receiver for receiving an object identification signal from an object identification device of which the personal interpretive device is within the transmission area of the object identification device;
      a storage device for storing object information, including audio data, graphic data, and text data for at least one of the plurality of objects, the object information for each object associated in the storage device with at least one object identification signal;
      a processor operatively coupled to the receiver and the storage device, retrieving from the storage device the object information associated with the object identification signal received by the receiver;
      an audio output device operatively coupled to the processor adapted to output audio data included in the retrieved object information;
      a display operatively coupled to the processor, adapted to output text data or graphic data included in the retrieved object information; and
      a map generator operatively coupled to the display for generating a map having graphic representations of selected objects, the map generator operatively coupled to the storage device for retrieving from the storage device the graphic representation of the selected objects.

2. The system of claim 1, wherein for each object the object information includes object comparison information comparing an object with selected other objects, and wherein personal interpretive device further comprises:
   an object memory operatively coupled to the receiver for storing an object identifier of the object for which the processor retrieved object information.

3. The system of claim 2, wherein the object information for each object includes levels of object information, including general object information and a detailed object information, and wherein the object memory further stores for each object for which object information is retrieved, an object identifier and the level of object information retrieved from the storage device for the object, the personal interpretive device further comprising:
   information selector operatively coupled to the processor and the display, for controlling the processor to retrieve from the storage device either detailed object information or general object information associated with an object identified by the object identification signal received by the receiver.

4. The system of claim 1, wherein the personal interpretive device further comprises:
   a text marker operatively coupled to the processor for marking text data retrieved by the processor from the storage device; and
   a marked text memory operatively coupled to the text marker for storing a signal representative of marked text data, the processor retrieving from the storage device marked text data according to signals stored in the marked text memory, and outputting to the display signals representative of the marked text data.

5. The system of claim 1, further comprising:
   a base signaling device for periodically transmitting a control signal to the receiver, the control signal for determining that the receiver is coupled to the base signaling device; and
   a timer operatively coupled to the receiver for initiating and continuing a timing function if the receiver is uncoupled from the base signaling device, the timing function determining an elapsed time beginning with the uncoupling of the receiver from the base signaling device; and
   a termination module operatively coupled to the timer and the receiver for terminating operation of the receiver where the elapsed time determined by the timer equals or exceeds a predetermined elapsed time.

6. The system of claim 5, wherein the termination module is further coupled to the display for terminating the display of text data.

7. The system of claim 5, wherein the personal interpretive device further comprises:
   a warming device operatively coupled to the timer and the display, for controlling the display to display a warning when the timer determines that the elapsed time equals a predetermined warning elapsed time.

8. The system of claim 5, wherein the base signaling device transmits to the receiver a control signal representative of the predetermined elapsed time.

9. The system of claim 1, wherein the display comprises a contact-sensitive liquid crystal display panel, the contact-sensitive liquid crystal display panel providing an interface for controlling the processor.

10. The system of claim 1, wherein each object identification device transmits the object identification signal as an infra-red signal, or electromagnetic signal.

11. The system of claim 1, wherein each object has an object identifier and an object type, and wherein the personal interpretive device further comprises:

an object type selector for selecting and storing an object type;

an object tour selector, operatively coupled to the object type selector, for selecting a set of objects having a selected object type, and storing the object identifiers of the set of objects in an object memory; and, an object comparator operatively coupled to the receiver and the processor, for comparing the object identifier of an object identified by an object identification signal received from an object identification device with object identifiers stored in the object memory, wherein the processor retrieves from the storage device selected object information associated with the object identified by the object identification signal where the object identifier of the object is one of the object identifiers stored in the object memory.

12. The system of claim 11, wherein each object information includes an object review time, the personal interpretive device further comprises:

a usage time selector for selecting and storing a usage time; and an object time accumulator operatively coupled to the usage time selector, for determining the selected object information such that a cumulative object review time is equal to or less than the usage time.

13. The system of claim 1, wherein each object information includes a plurality of user levels, each user level indicative of different user knowledge, such that for each user level there is associated object information, the personal interpretive device further comprising:

user level selector coupled to the processor, for selecting and storing a signal representative of a user level, wherein the processor retrieves from the storage device object information associated with the selected user level.

14. The system of claim 1, wherein the personal interpretive device further comprises:

a synchronization module operatively coupled to the display and the audio output device for synchronizing the display of text data or graphic data on the display with the outputting of audio data by the audio output device.

15. The system of claim 14, wherein the synchronization module further comprises:

a timer, operatively coupled to the audio output device, to determine a time remaining for the outputting of audio data by the audio output device, the timer further coupled to the display to display the time remaining in conjunction with the outputting of the audio data.

16. The system of claim 1, wherein the object identification device further comprises:

at least one identification switch having a plurality of selectable positions for providing the object identification device with an identification number, the identification number transmitted by the object identification device as part of the object identification signal.

17. The system of claim 1, wherein each object has an object identifier, and wherein the personal interpretive device further comprises:

an object selector for displaying on the display a selection of object identifiers, for selecting at least one object identifier, the object selector operatively coupled to the map generator, wherein the map generator retrieves from the storage device a graphic representation of the object having the selected object identifier.

18. The system of claim 1 further comprising:

an object memory operatively coupled to the receiver for storing an object identifier of the object for which the processor retrieved object information; and an object set comparator operatively coupled to the object memory and the processor for comparing selected object identifiers stored in the object memory with a predetermined set of object identifiers identifying of a predetermined set of objects, wherein the processor retrieves from the storage device and displays on the display object identifiers for additional objects for which object information has not been previously retrieved where the selected object identifiers match the predetermined set of object identifiers.

19. The system of claim 2, wherein the object information for each object includes detailed object information including a plurality of detailed object information items each having a theme, wherein the personal interpretive device further comprises:

a theme selector operatively coupled to the processor and the display for providing a selection of a theme corresponding to one of the detailed object information items, and for controlling the processor to retrieve from the storage device the detailed object information item having the selected theme for an object identified by an object identification signal received by the receiver.

20. The system of claim 2, wherein the storage device stores an identification number assigned to the personal interpretive device, the personal interpretive device further comprising:

a transmitter, operatively coupled to the storage device, for transmitting the identification number to at least one other personal interpretive device; and each personal interpretive device further receiving transmitted identification numbers from selected other personal interpretive devices, and storing the identification numbers in the storage device, wherein a first personal interpretive device transmits selected identification numbers and selected object identifiers associated with select object information, the personal interpretive devices assigned to the selected identification numbers retrieving the object information associated with the selected object identifiers.

21. A computer implemented method for retrieving and displaying object information for any of a plurality of distributed objects, each object associated with object information, the method comprising the steps of:

storing object information in a memory, including audio data, graphic data, and text data, for at least one of the plurality of objects, the object information for each object being stored in association with at least one object identification signal associated with the object;

wirelessly receiving a transmitted object identification signal within a transmission area in a vicinity of at least one object;

retrieving from storage the object information associated with the received object identification signal for the at least one object;

outputting audio data included in the retrieved object information;

displaying text data or graphic data included in the retrieved object information;

selectively retrieving a stored graphic representation of selected objects; and generating a map having the graphic representations of the selected objects.

22. The method of claim 21, further comprising the steps of:

storing an object identifier for each object for which object information was retrieved; and comparing selected stored object identifiers with a predetermined set of object identifiers identifying of a predetermined set of objects, wherein object comparison information is retrieved from storage where the selected stored object identifiers match the predetermined set of object identifiers, the object comparison information comparing the objects identified by the selected stored object identifiers.

23. The method of claim 22, wherein the object information for each object includes levels of object information, including general object information and detailed object information, the method further comprising the steps of:

providing a selection of a level of object information;

retrieving from storage the selected level of object information for an object for which an object information signal is received;

storing an object identifier and a level of object information retrieved for the object; and determining a count of the stored object identifiers of objects for which detailed object information has been retrieved, wherein detailed object information is retrieved from storage for another object if the count of the stored object identifiers equals or exceeds a predetermined count.

24. The method of claim 20, further comprising the steps of:

marking text data retrieved from storage;

storing a signal representative of marked text data;

retrieving marked text data from storage according to the stored signals; and outputting signals representative of marked text data.

25. The method of claim 20, wherein there is provided a base signaling device and a receiver, the method further comprising the steps of:

periodically transmitting a control signal from the base signaling device, the control signal for determining that the receiver is coupled to the base signaling device;

initiating and continuing a timing function if the receiver is uncoupled from the base signaling device, said timing function determining an elapsed time from the uncoupling of the receiver from the base signaling device; and terminating operation of the receiver where the elapsed time determined by the timers equals or exceeds a predetermined elapsed time.

26. The method of claim 25, further comprising the step of:

displaying a warning when the elapsed time equals a predetermined warning elapsed time.

27. The method of claim 25, wherein the control signal is representative of the predetermined elapsed time.

28. The method of claim 21, wherein each object has an object identifier and an object type, the method further comprising the steps of:

selecting and storing an object type;

selecting a set of objects having a selected object type, and storing the object identifiers of the set of objects;

comparing the object identifier of an object for which an object identification signal is received with stored object identifiers; and, retrieving from storage selected object information associated with an object where the object identifier of the object is one of the stored object identifiers.

29. The method of claim 28, wherein each object information includes an object review time, the method further comprising the steps of:

selecting and storing a usage time; and determining the selected object information having a cumulative object review time equal to or less than the usage time.

30. The method of claim 21, wherein each object information includes a plurality of user levels, each user level indicative of different user knowledge, such that for each user level there is associated object information, the method further comprising the steps of:

providing a means for selecting a user level;

receiving a user selection of a user level; and retrieving object information associated only with the selected user level.

31. The method of claim 21, further comprising the step of:

synchronizing the outputting of the audio data with the displaying of the text data or graphic data.

32. The method of claim 31, further comprising the steps of:

determining a time remaining for the outputting of audio data; and, displaying the time remaining in conjunction with the outputting of the audio data.

33. The method of claim 21, wherein each object has an object identifier, the method further comprising the steps of:

displaying a plurality of object identifiers;

providing a selection means for selecting at least one object identifier;

retrieving a stored graphic representation of an object having the selected object identifier; and displaying the graphic representation of the object.

34. The method of claim 21, further comprising the step of:

storing an object identifier for each object for which object information was retrieved; and comparing selected stored object identifiers with a predetermined set of object identifiers identifying of a predetermined set of objects, wherein object identifiers are retrieved and displayed for additional objects for which object information has not been previously retrieved where the selected object identifiers match the predetermined set of object identifiers.

35. The method of claim 21, wherein the object information for each object includes detailed object information including a plurality of detailed object information items each having a theme, the method further comprising the steps of:

providing a selection means for selecting a theme corresponding to one of the detailed object information items;

receiving a user selection of a theme; and, retrieving the detailed object information item having the selected theme for an object identified by an object identification signal.

36. The method of claim 21 further comprising the step of:
providing a game tour of selected objects in the facility comprising the steps of:
defining an objective for the game tour;
displaying selected object information about a current object, the object information retrieved from the memory in response to the selection of the current object;
accepting an input signal;
comparing the input signal with an object identification signal identifying the current object to determine if the input signal correctly identifies the current object;
determining if the objective is met; and
if the objective is not met, returning to the step of displaying selected object information, otherwise providing a summary of objective, path and input signals.

37. The method of claim 36, wherein the step of displaying selected object information about a current object further comprises the substeps of:
defining a path through the facility, the path including at least one object, the path defined by selecting an object stored in a memory; and
determining a current object on the path.

38. The system of claim 2, wherein the personal interpretive device further comprises:
an object set comparator operatively coupled to the object memory and the processor for comparing selected object identifiers stored in the object memory with a predetermined set of object identifiers identifying of a predetermined set of objects, wherein the processor retrieves from the storage device object comparison information where the selected object identifiers match the predetermined set of object identifiers, the object comparison information comparing the objects identified by the selected object identifiers stored in the object memory.

39. The system of claim 3, wherein the personal interpretive device further comprises:
an information counter operatively coupled to the object memory for determining a count of the object identifiers stored therein for which detailed object information is retrieved, wherein the information selector controls the processor to retrieve from the storage device detailed object information if the count equals or exceeds a predetermined count.

* * * * *